C. T. HENDERSON.
DYNAMIC BRAKING CONTROLLER.
APPLICATION FILED OCT. 14, 1913.

1,134,197.

Patented Apr. 6, 1915.
2 SHEETS—SHEET 2.

Witnesses
J. L. Johnson
H. Watson

Inventor
Clark T. Henderson
By Edwin Bittower, Jr.
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

DYNAMIC-BRAKING CONTROLLER.

1,134,197.  Specification of Letters Patent.  Patented Apr. 6, 1915.

Application filed October 14, 1913. Serial No. 795,087.

*To all whom it may concern:*

Be it known that I, CLARK T. HENDERSON, a citizen of the United States, residing at Milwaukee, in the county of Milwaukee and State of Wisconsin, have invented new and useful Improvements in Dynamic-Braking Controllers, of which the following is a full, clear, concise, and exact description, reference being had to the accompanying drawing, forming a part of this specification.

My invention relates to improvements in dynamic braking controllers for alternating current motors.

It is particularly applicable to controllers such as that illustrated in my co-pending application, Serial No. 520,128, filed Sept. 29, 1909, and other controllers wherein the stator of the motor is connected to a source of direct current for dynamic braking, and wherein the dynamic braking action is regulated by variation of resistance in a rotor circuit. In such controllers it has been found that the variation in resistance of the rotor circuit and consequent variation of the rotor current reacts upon the stator and tends to distort and destroy the field produced by the direct current excitation, with the result of effecting the dynamic braking action to an undesirable degree in some cases.

My invention has among its objects to provide means for automatically varying the power supplied to the stator as the resistance in the rotor circuit is varied and thereby maintain the efficiency of the dynamic brake.

Other objects and advantages of my invention will hereinafter appear.

In order to more fully and clearly disclose the nature and advantages of my invention I shall describe the embodiments thereof illustrated in the accompanying drawings, in which it has been applied to controllers substantially the same as that disclosed in my co-pending application aforesaid. It should be understood, however, that my invention might be applied to other forms of controllers and that certain features thereof might be embodied in other forms than that illustrated.

Figure 1:
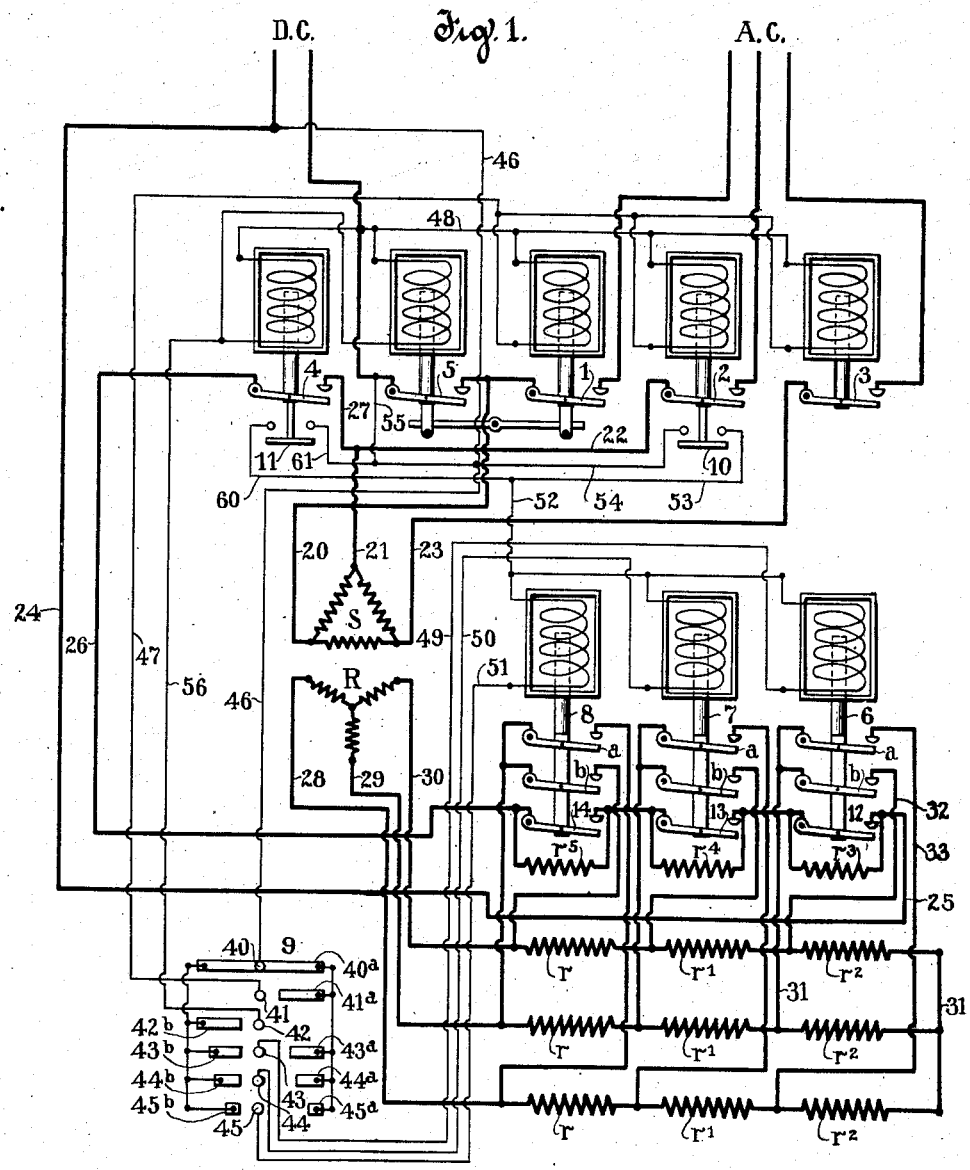
Figure 2:
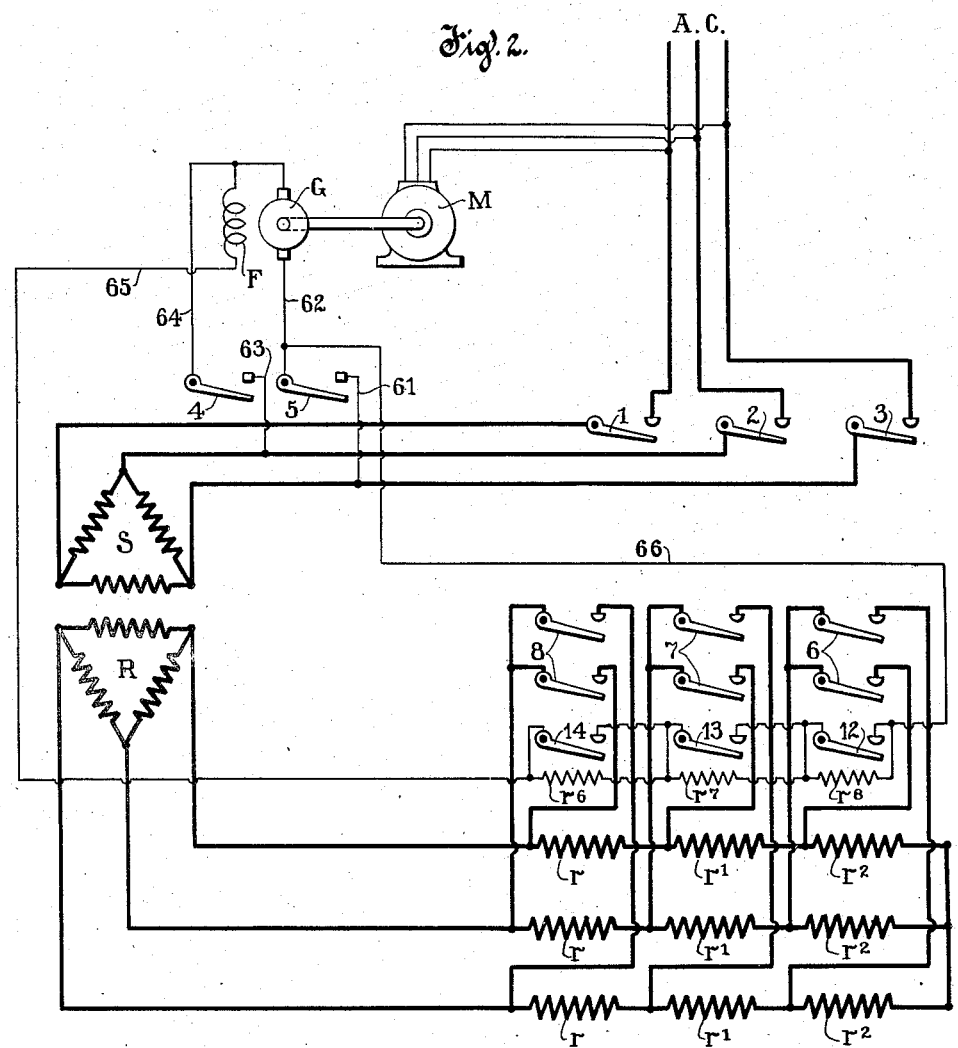

In the drawings, Figure 1 shows a controller wherein the stator excitation is regulated by means interposed between it and the source of supply; Fig. 2 shows a controller wherein the stator excitation is regulated by direct regulation of the supply source.

The controller shown in Fig. 1, like the controller disclosed in my co-pending application, aforesaid, is provided with switches for connecting the stator of the motor to either an A. C. circuit for running or a D. C. circuit for dynamic braking and with other switches for regulating resistance in the rotor circuit for acceleration and dynamic braking.

The motor is diagrammatically illustrated as provided with a stator S and a rotor R. Electro-responsive switches 1, 2, and 3 are provided for connecting the stator to an alternating current circuit A. C., while electro-responsive switches 4 and 5 are provided for connecting the stator to a direct current circuit D. C. Electro-responsive switches 6, 7 and 8 are provided for regulating three sets of resistances, $r$, $r'$, $r^2$, in the rotor circuit. The operating windings of the aforesaid switches are all supplied with current from the D. C. circuit and are governed by a master switch 9 hereinafter specifically described. The master switch 9 when moved in one direction energizes switches 1, 2, 3, 6, 7, and 8 for starting and accelerating the motor in the usual way. When moved in an opposite direction it energizes switches 4 and 5, to connect the stator to the D. C. circuit for dynamic braking, and also controls the switches 6, 7 and 8 to vary the resistance in the rotor circuit and thereby vary the dynamic braking action of the motor. The switches 2 and 4 are provided with auxiliary contacts 10 and 11 respectively, included in circuit with the operating winding and the switches 6, 7, and 8, whereby said latter switches can only respond when one of the former switches is closed to connect the stator to one of the two supply sources.

Referring now to the additional features of the present controller, the same include resistances $r^3$, $r^4$, and $r^5$ adapted to be inserted in circuit between the direct current supply and the stator and control switches 12, 13 and 14 therefor. The switches 12, 13 and 14 when closed short-circuit their respective resistances and are utilized to vary the potential impressed upon the stator as the resistance in the rotor circuit is varied. In practice it has been found necessary to provide a higher degree of excitation of the stator when all resistance in the secondary circuit is short-circuited, or when the load is being permitted to descend at the minimum speed than is either necessary or desirable when the resistance is included in the secondary circuit and the load is permitted to descend at an increased speed. In other words, it is desirable to offset the reaction of insertion of resistance in the rotor circuit by reduction in the potential impressed upon the stator. I, therefore, preferably provide the resistance for the stator of a value sufficient to give the desired range of potential variation, and to vary the same in steps equal in number to the steps of variation of the rotor resistance. Also, I preferably connect the controlling switches of the two sets of resistances for simultaneous operation. Such an arrangement is illustrated, the switches 12, 13 and 14 being operatively connected to the switches 6, 7 and 8 respectively. Thus one section of the stator resistance is inserted in circuit simultaneously with the insertion of each step of the rotor resistance. Accordingly as the rotor resistance is inserted in circuit the excitation of the stator is reduced to a predetermined degree to compensate for the variation in the reaction of the rotor upon the stator, thereby maintaining the desired electrical conditions for dynamic braking.

The circuit connections of the controller are obtained as follows: The switches 1, 2, and 3 when closed connect one terminal of the stator by conductor 20 through switch 1 to the left hand supply line of the A. C. circuit, a second terminal by conductor 21 and 22 through switch 2 to the center supply line, and a third terminal by conductor 23 through switch 3 to the right hand supply line. The switches 4 and 5 when closed complete a circuit from the left hand side of the D. C. supply circuit by conductors 24 and 25, through resistances $r^3$, $r^4$ and $r^5$ in series by conductor 26, through switch 4, by conductors 27 and 21, through stator by conductor 20, through switch 5 to the right hand side of the D. C. circuit. The circuit of the rotor extends from the three terminals thereof by conductors 28, 29 and 30, through the sets of resistances $r$, $r'$ and $r^2$ to a common connection 31. The switch 6 is adapted to short circuit the resistance $r$ through its contacts $a$ and $b$ and conductors 31, 32 and 33. The switches 7 and 8 are adapted to short-circuit the resistances $r'$ and $r^2$ by similar contacts and conductors.

The master switch 9 is adapted to control the energizing circuits of the several switches through contact fingers 40, 41, 42, 43, 44, and 45 and two sets of coöperating contact segments. A segment $40^a$ is provided for continuous contact with the finger 40. The two sets of segments coöperating with fingers 41 to 45 are disposed on opposite sides thereof. One set includes segments $41^a$, $43^a$, $44^a$ and $45^a$ while the other set includes segments $42^b$, $43^b$, $44^b$ and $45^b$. The "$a$" segments when thrown into engagement with their corresponding fingers energize switches 1, 2, 3, 6, 7, and 8 for running while the "$b$" segments when thrown into engagement with said fingers energize switches 4, 5, 6, 7 and 8 for dynamic braking.

Assume that the "$a$" segments are moved into engagement with their respective fingers. This first completes a circuit from the left hand side of the D. C. circuit by conductor 46 to finger 40 and segment $40^a$ to segment $41^a$ and finger 41 by conductor 47 through the operating windings of switches 1, 2 and 3 in parallel to conductor 48 and thence to the right hand side of the D. C. circuit. The switches 1, 2 and 3 are thereupon closed, connecting the stator to the A. C. circuit as already described. Continued movement of the controller then successively establishes circuits from segment $40^a$ through the segments $43^a$, $44^a$ and $45^a$ to fingers 43, 44, and 45 and thence by conductors 49, 50 and 51 to the operating windings of switches 6, 7 and 8 respectively. These windings have a common return by conductors 52 and 53 through the auxiliary switch 10 of switch 2 by conductors 54 and 55 to the left hand side of the D. C. supply circuit. The switches 6, 7 and 8 thereupon respond successively to short-circuit the resistances $r$, $r'$ and $r^2$ from the rotor circuit.

Assume now that controller be moved to engage "$b$" segments with the fingers 42 to 45. Switches 1, 2, 3, 6, 7, and 8 are first de-energized. Then a circuit is closed from segment $40^a$ to segment $42^b$ and contact finger 42, by conductor 56, through the coils of switches 4 and 5 in parallel to the left hand side of the D. C. supply circuit. Thereupon said switches respond, thereby connecting the stator to the D. C. circuit, as above described. At the same time the operating windings of the switches 6, 7, and 8 are all connected to the D. C. circuit by the segments $42^b$, $43^b$ and $45^b$, and their return circuit is completed immediately upon closure of switch 4. This return circuit then extends from conductor 52, by conductor 60, through the auxiliary contact 11 of switch 4, by conductor 61 to conductor 55 and thence to the left hand side of the D. C. circuit. Accordingly all three of the switches 6, 7, and 8 respond immediately upon closure of switch 4, thereby short-circuiting the resistances $r$, $r'$ and $r^2$ in the rotor circuit. As above set forth, the switches 12, 13 and 14 close simultaneously with the switches 6, 7 and 8 and accordingly short-circuit the resistances $r^3$, $r^4$ and $r^5$ in the stator circuit. If now the controller 9 be moved farther in the same direction it will successively disengage the segments $45^b$, 44ᵇ and 43ᵇ from their corresponding contact fingers, thereby successively deënergizing switches 6, 7, and 8 with the result of gradually inserting the resistances in both the rotor circuit and the stator circuit.

The controller shown in Fig. 2 is similar to that shown in Fig. 1, with the exceptions hereinafter noted and for simplicity of illustration the operating windings of the several switches, the control circuits thereof and the master switch have been omitted. In this controller the direct current excitation of the stator is provided for by a generator G driven by a motor M, supplied with current from the A. C. circuit. The generator G is of the shunt wound type, being provided with a shunt field winding F having connected in series therewith resistances $r^6$, $r^7$ and $r^8$, arranged and controlled similarly to the resistances $r^3$, $r^4$, and $r^5$ of the controller shown in Fig. 1. The insertion of resistance in the field circuit of a shunt generator reduces the output of the generator and accordingly the controller as described in connection with Fig. 1 will gradually weaken the field of the generator G upon insertion of resistance in the rotor circuit and thereby reduce the potential impressed upon the stator winding. It thus affects the same result as that described in connection with Fig. 1.

In this controller the switches 4 and 5 connect one terminal of the stator by conductors 61 and 62 to one terminal of the generator G and a second terminal of the stator by conductors 63 and 64 to the opposite terminal of the generator. The field circuit of the generator extends from conductor 64 through the field winding by conductor 65 through the resistances $r^6$, $r^7$, and $r^8$ by conductor 66 to conductor 62. The remaining circuit connections are the same as those illustrated in Fig. 1.

What I claim as new and desire to secure by Letters Patent is:

1. The method of controlling an alternating current motor for dynamic braking consisting in exciting its stator from a source of direct current and simultaneously regulating the rotor circuit and varying the excitation of the stator.

2. The method of controlling an alternating current motor for dynamic braking consisting in exciting the stator from a source of direct current and varying the excitation of the stator and the resistance of the rotor circuit to corresponding degrees.

3. The method of controlling an alternating current motor for dynamic braking consisting in exciting the stator by direct current and varying the excitation of the stator and the resistance of the rotor circuit simultaneously and to corresponding degrees.

4. In a dynamic braking controller for alternating current motors, in combination, means for supplying the stator of the motor with direct current, means for regulating the dynamic braking current generated in the rotor circuit, and means for varying the current supplied to the stator, said last two mentioned means being interlocked to operate together.

5. In a dynamic braking controller for alternating current motors, in combination, means for connecting the stator to a source of direct current, means for varying the resistance of the rotor circuit to regulate the dynamic braking action, and means for decreasing the current supplied to the stator upon increase of the resistance of the rotor circuit.

6. In a dynamic braking controller for alternating current motors, in combination, means for connecting the stator of the motor to a source of direct current, means for varying the resistance of the rotor circuit to regulate the dynamic braking action, and means operated by said second-mentioned means to vary the direct current excitation of the stator substantially simultaneously with the variation of the rotor resistance.

7. In a dynamic braking controller for alternating current motors, in combination, means for connecting the stator of the motor to a source of direct current, means for varying the resistance of the rotor circuit to regulate the dynamic braking action, and means operated by said second-mentioned means to vary the direct current excitation of the stator substantially simultaneously with the variation of the rotor resistance, and to a proportional degree.

8. In a dynamic braking controller for alternating current motors, in combination, means for connecting the stator of the motor to a source of direct current, a resistance for the rotor circuit, means for varying said resistance in steps to regulate the dynamic braking action, and means operating with said former means to vary the current supplied to the stator proportionally to the variation of said resistance.

9. In a dynamic braking controller for alternating current motors, in combination, means for connecting the stator to a source of direct current, a resistance for the rotor circuit, means for varying said resistance in steps to regulate the dynamic braking action, and means operating with said former means to vary the current supplied to the stator to different degrees proportional to the variations of said resistance, said last-mentioned means affecting a reduction in the current of the stator circuit upon insertion of said resistance in the rotor circuit.

10. In a dynamic braking controller for alternating current motors, in combination, means for connecting the stator of the motor to a source of direct current, a resistance for the rotor circuit, a second resistance controlling the excitation of the stator, and means for simultaneously varying said resistance.

11. In a dynamic braking controller for alternating current motors, in combination, means for connecting the stator of the motor to a source of direct current, a resistance for the rotor circuit, a second resistance controlling the excitation of the stator, and means for simultaneously varying said resistances, to decrease the stator excitation upon increasing the resistance in the rotor circuit.

12. In a dynamic braking controller for alternating current motors, in combination, means for connecting the stator of the motor to a source of direct current, a resistance for the rotor circuit, a resistance for varying the D. C. excitation of the stator and a plurality of electro-responsive switches controlling said resistances to decrease the stator excitation upon increasing the resistance in the rotor circuit.

13. In a dynamic braking controller for alternating current motors, in combination, means for connecting the stator of the motor to a source of direct current, resistances for the rotor circuit, a resistance controlling the excitation of the stator and a plurality of electro-responsive switches each controlling a portion of said second-mentioned resistance and a portion of the rotor resistance to vary the current supplied to the stator upon variation of the rotor resistance.

In witness whereof, I have hereunto subscribed my name in the presence of two witnesses.

CLARK T. HENDERSON.

Witnesses:
F. H. HUBBARD,
TEHLA BART.